United States Patent [19]
Delueg et al.

[11] Patent Number: 5,365,306
[45] Date of Patent: Nov. 15, 1994

[54] METHOD AND APPARATUS FOR REGULATION OF THE AMOUNT OF PRINTING LIGHT IN PHOTOGRAPHIC ENLARGING OR PRINTING DEVICES

[75] Inventors: Verner Delueg, Vahrn; Alex Vinatzer, Brixen, both of Italy

[73] Assignee: Durst Phototechnik GmbH, Brixen, Italy

[21] Appl. No.: 892,577

[22] Filed: Oct. 12, 1993

[30] Foreign Application Priority Data

Oct. 4, 1990 [IT] Italy .................................. 4844-A/90

[51] Int. Cl.$^5$ .............................................. G03B 27/80
[52] U.S. Cl. ........................................ 355/38; 355/77
[58] Field of Search ...................... 355/32, 35, 38, 68, 355/77; 356/444; 358/76, 80

[56] References Cited

U.S. PATENT DOCUMENTS

| | | | |
|---|---|---|---|
| 4,319,834 | 3/1982 | Terrill | 355/35 |
| 4,371,259 | 2/1983 | Howitt | 355/38 |
| 4,610,538 | 9/1986 | Takenaka | 355/69 |
| 4,678,319 | 7/1987 | Reiterer | 355/38 |
| 5,032,866 | 7/1991 | Shoden et al. | 355/38 |

FOREIGN PATENT DOCUMENTS 0154722  9/1985  European Pat. Off. .

*Primary Examiner*—D. Rutledge
*Attorney, Agent, or Firm*—Cahill, Sutton & Thomas

[57] ABSTRACT

According to a process for regulating the amount of copying light in a closed control loop of a photographic color photocopier equipped with color filters, the copying light is selectively measured in the primary colors, red, green and blue. A deviation resulting from the comparison of the real values with predeterminable set values is subdivided into a color deviation and a brightness deviation. The color deviation is compensated by regulating the color filters, whereas the brightness deviation is converted into a correction factor for the lighting time, so that for each primary color the product of the light intensity real value by the effective lighting time is constant and identical to the product of the light intensity set value by the lighting time set value.

16 Claims, 2 Drawing Sheets

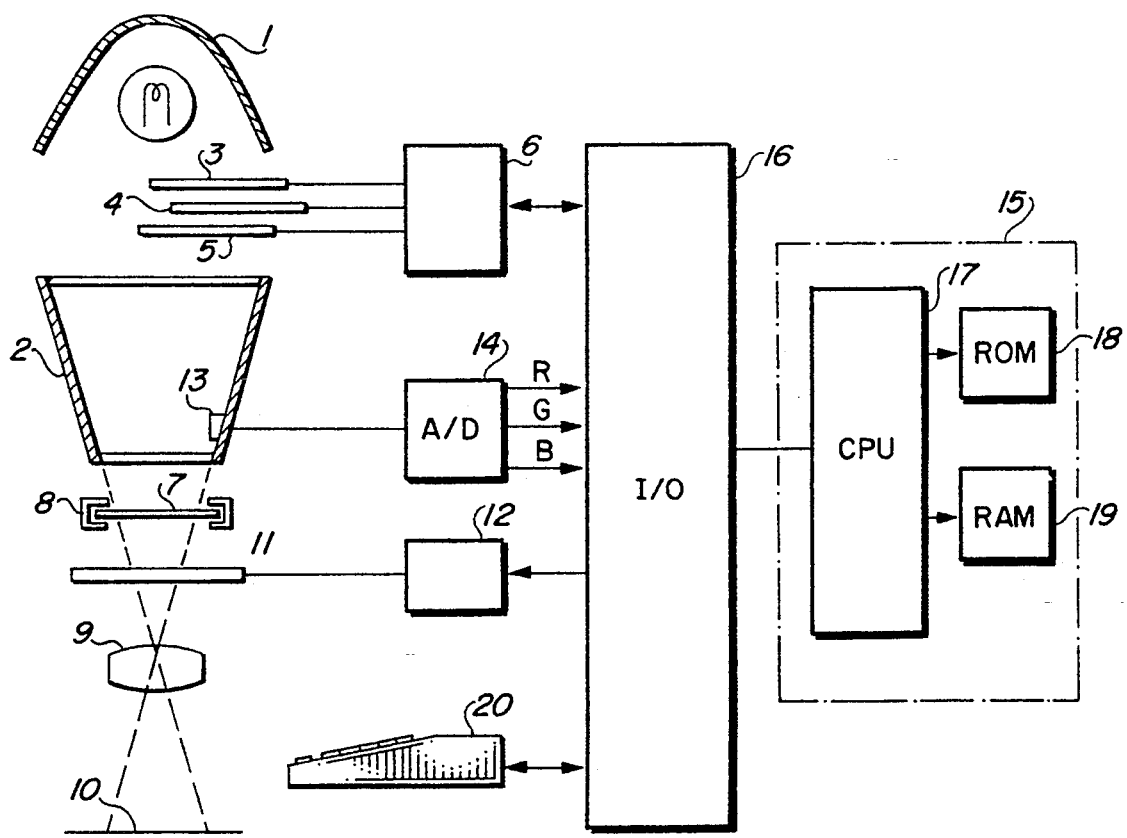
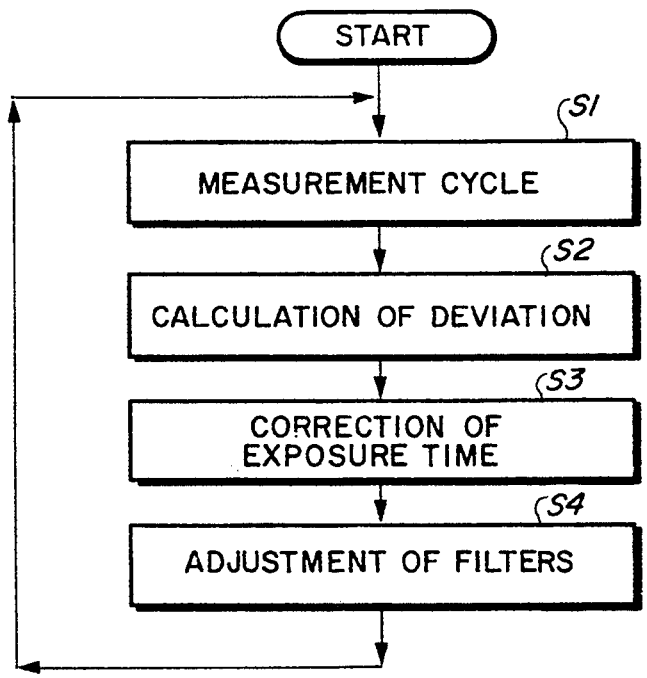

1

METHOD AND APPARATUS FOR REGULATION OF THE AMOUNT OF PRINTING LIGHT IN PHOTOGRAPHIC ENLARGING OR PRINTING DEVICES

TECHNICAL FIELD

The present invention relates, in general, to the field of color exposure in the production of photographic prints of a film original, using an enlarging or printing device. In particular, the invention relates to a method and an apparatus for regulation of the amount of printing light in the color exposure in photographic color printing devices.

STATE OF THE ART

In known color printing devices, the printing light is adjustable in its color composition, in order to balance out any color deviations which have occurred in the film material during storage, during exposure or development, or to bring about color changes in the print, in accordance with individual requirements. Exposure takes place with a uniform exposure time for all color layers of the print material.

The necessary color adjustment of the printing light can be carried out both according to the additive color mixture method and the subtractive one. A color light head of an enlargement device which functions according to the additive method has three separate light sources adjustable in intensity where each light source has a color filter with a transmission range in one of the primary colors red, green and blue place in front of it. In contrast, a color light head which functions according to the subtractive method has a single, essentially white light source, where three subtractive filters, which each block one primary color, can be inserted into the beam of light to color the light, in an infinitely variable manner.

The adjustability of the printing light in the three primary colors requires calibration of the system. Only in this way can defined settings be valid for several devices, and changes in the adjustment of different initial values produce the same effect. The unit of this calibration is the so-called filter value.

In the case of color light heads with purely mechanical filter adjustment, the value indicated on the filter scale does not always agree with the actual filter value. The cause for this can be centricity errors of the lamp spiral with reference to the reflector, diameter and shape tolerances of the reflector, power and temperature differences of the lamps, secondary densities of the filters, as well as changes in the spectral characteristic of the reflector and the filter due to temperature changes.

In order to reduce such interference influences, color light heads with a closed control circuit (closed loop) were already developed, in which the light influenced by the color filters is measured by three photoelectric sensors sensitive in the colors red, green and blue, and compared with reference values adjustable at a control console. In the closed loop, the filters are automatically adjusted until a deviation which is present has been balanced out. In this manner, a printing light is obtained which agrees with the values set at the control console in color and density, remains constant over time and is reproducible at any time. If regulation of the printing light is carried out exclusively using the subtractive color filters, these must already lie partially in the beam path in their initial position, in order to be able to counteract any light reduction, which occurs due to secondary densities of the filters, aging of the lamp or in another manner by moving one or more filters out of the beam path. In particular, all three filters have to be adjusted together for a change in the neutral density, i.e., the brightness at constant color composition. In addition to a systematic light loss, this also means a reduction in the effective adjustment range of the color filtration.

In another known method of procedure, the filter control is designed in such a way that all three filters are never located in the beam path at the same time. Here, neutral density values are adjusted by regulation of the light intensity by changing the lamp voltage. The neutral density then corresponds to the difference between the reference value and the measured value in the color of that filter which is at zero, i.e. lies outside of the beam path. In this connection, it is a disadvantage that a changing lamp voltage results in greater wear of the lamp, and also causes changes in the color temperature of the light given off, which must be balanced out again with another filter position. Such balancing is always incomplete, however, due to the incomplete adaptation of the measurement sensors to the spectral sensitivity of the print material.

Another method frequently used in practice provides an adjustable density diaphragm in addition to the color filters, for regulation of the neutral density. With this type of regulation of the light intensity, the color temperature of the lamp is not influenced and the problems in this regard are eliminated. However, the incomplete utilization of the available light flux remains a problem, because the density diaphragm must already also be partially effective in its initial position, in order to allow a change in light intensity both in the direction of an increase and in the direction of a decrease.

DISCLOSURE OF THE INVENTION

The invention is based on the task of indicating a method and an apparatus for regulation of the amount of printing light, which avoids the disadvantages of the known methods as indicated, and, in particular, allows better utilization of the available light flux with the goal of reducing the exposure times that can be achieved.

Pursuant to the method according to the invention which accomplishes this task, the light of the enlarging device which is influenced by the color filters is selectively measured in the primary colors red, green and blue, and compared with reference values, in a closed loop, where a deviation resulting from the comparison of the actual values with preset reference values is divided into color deviation and brightness deviation; the color deviation is balanced out by regulation of the color filters, while the brightness deviation is converted into a correction factor for the exposure time, in such a manner that for each primary color, the product of the actual value of the light intensity and the effective exposure time is constant and equal to the product of the reference value of the light intensity and the preset nominal exposure time.

In the method according to the invention, not only does the control loop therefore detect the intensity of the printing light, in order to regulate out color and brightness deviations, but the amount of light, as a product of the light intensity ($I_{y,m,c}$) and exposure time (ET) is also included in the regulation. Any change in neutral density is compensated by a corresponding change in exposure time, via the correction factor which enters into the exposure time. The effective exposure time then deviates from the preset nominal exposure time.

In this manner, an additional diaphragm to regulate the neutral density is not necessary. This eliminates the light loss which such a diaphragm inevitably brings with it, and full utilization of the available light generally results in shorter exposure times. The elimination of the diaphragm also means a savings in costs, since the relevant mechanical parts and the related control device are eliminated. It is advantageous if the difference between the calculated effective exposure time and the nominal exposure time originally set is displayed on a display device. If work is to be carried out with an essentially uniform exposure time, a greater deviation of the effective exposure time from the nominal value can be compensated using the lens aperture stop.

Regulation takes place in repeating regulation cycles, even during exposure. The effective exposure time is updated over the period of exposure, during each regulation cycle, in accordance with the mean value of the correction factors from the sequence of cycles which have elapsed since the start of exposure.

Further characteristics and advantages of the method according to the invention and the apparatus for carrying out the same are evident from the dependent claims, in connection with the following description of a preferred embodiment and the attached drawings.

BRIEF DESCRIPTION OF THE DRAWINGS

FIG. 1 is a schematic representation of an enlarging device, in which the invention is used;

FIG. 2 is a block diagram to explain the function principle of the closed loop in the enlarging device according to FIG. 1;

BEST WAY TO IMPLEMENT THE INVENTION

Figure 3:
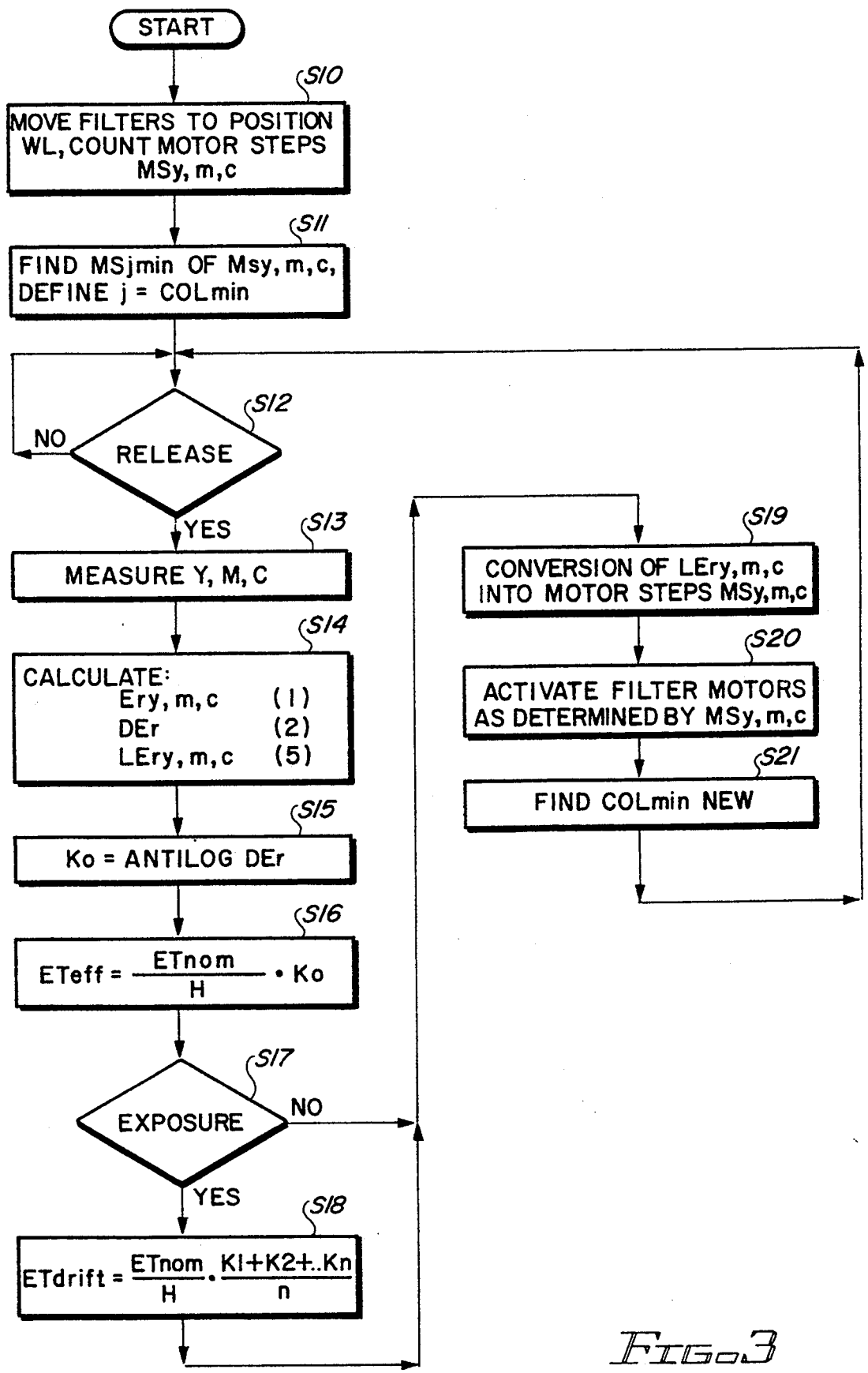
FIG. 3 is a flow chart of the closed loop according to FIG. 2.

In FIG. 1, the reference number 1 refers to a light source, which gives off essentially white light in the direction of a light mixing box 2. Three color filters 3, 4 and 5 in the complementary colors cyan, magenta and yellow are arranged between the light source and the mixing box. Each filter can be introduced into the beam path independently of the others and in infinitely variable manner, via a filter drive 6, and causes coloration of the originally essentially white light, to a greater or lesser degree, depending on its insertion depth. The light colored in such a way, exiting from the mixing box in diffuse manner, shines through an original 7 to be printed, which is held in a film trap 8, and is focalized onto the print material 10 by a lens 9, causing a latent image of the original 7 to form. In the region between the lens and the original, a shutter 11 is arranged, which is activated via a drive 12.

In the interior of the mixing box 2, photoelectric sensors 13, which respond selectively to the colors red, green and blue, by means of color filters placed in front of them, are arranged in the region of the light which is homogeneous in color. The electric color signals supplied by the sensors 13 are passed to an analog/digital converter 14 and converted into digital signals, which are passed to a microprocessor system 15 via an I/O interface 16.

The microprocessor system, which is actually known, comprises the I/O interface 16, a central processor unit (CPU) 17, a read-only memory (ROM) 18, preferably programmable, as well as a memory with random access (RAM) 19. Furthermore, an input and display device 20 structured as a control console is connected with the microprocessor system 15 via the I/O interface 16, by way of which data or commands can be input into the system and operating data can be displayed visually.

The microprocessor system controls the filter drive 6 and the shutter drive 12. The filters are activated by stepper motors, where each step corresponds to a defined change in the filter value in the corresponding color. Each filter is furthermore equipped with a position switch (Swy,m,c), which supplies the switching information 1 or 0, depending on whether the filter is in the active position or in the zero position outside of the beam path.

FIG. 2 illustrates the function principle of the closed loop according to the invention. In a measurement phase S1, the actual values of the light intensity are measured in each primary color, by means of the sensors 13. In a subsequent calculation phase S2, the measurement values, after digital processing, are compared with reference values set at a control console, in order to calculate a correction value for the exposure time (S3) from a deviation determined with regard to neutral density, and to derive a setting value for filter adjustment (S4) from the deviation with regard to color. The complete measurement and regulation cycle is repeated continuously, so that constant regulation of the amount of printing light to preset values is guaranteed.

FIG. 3 shows a flow chart to illustrate the operation sequence of the individual steps within the closed loop. The method proceeds on the assumption that at most two of the three color filters are supposed to lie in the beam path at the same time, because a partial cross-section of the light bundle covered by all three filters would only result in a loss in brightness, without any influence on the color composition. This circumstance has to be taken into account by the regulation system, in that among the three color components it determines the one which is proportionally the weakest (referred to as COLmin in the following). For this purpose, the stepper motors of the filters 3, 4 and 5 are activated in a preadjustment phase S10, in order to move the filters first into the white light position (WL) outside the beam bundle, where the motor steps MSy,m,c required for this purpose are counted for each filter. The color of the filter with the smallest step number MSjmin (j=y, m or c) is defined as COLmin (S11). Therefore, the color of that filter which was already in the white light position originally, or was closest to it in comparison with the others, is defined as COLmin. When the projection light is switched on in step S12, release for the light measurement in the light mixing box takes place in the next step S13, which corresponds to step S1 of FIG. 2. The measurement values recorded by means of the sensors 13 in the individual colors are converted into logarithmic values in the microprocessor system, using software, so that the measurement result is available in the form of color density values Y (yellow), M (magenta) and C (cyan) with reference to the subtractive color filters.

A calculation step S14 follows, which corresponds to the step S2 of FIG. 2, in which deviations Ery,m,c are derived from the comparison of the measured values Y, M, C and reference values TVy,m,c set at the control console, according to the following equation:

$$Ery = H + TVy - Y \quad (1)$$
$$Erm = H + TVm - M$$
$$Erc = H + TVc - C$$

where H is a constant which refers to a calibration of the measurement system at white light, using a calibrated test lamp. Further calculation steps have the purpose of deriving separate deviations with regard to the color proportion and with regard to the brightness proportion which all three colors have in common (neutral density) from the deviation Ery,m,c. The neutral density deviation (DEr) is identical with that of the three values Ery, Erm or Erc which relate to the color already identified as COLmin in the preceding step S11, in other words $$DEr = Er(COLmin) \quad (2)$$

In step S15, DEr is used to calculate a correction factor K according to $$Ko = antilog\ DEr \quad (3)$$

and in a further step S16, an effective exposure time (ETeff) is calculated from the preset nominal exposure time (ETrom) according to the equation $$ETeff = \frac{ETnom}{H} \cdot Ko \quad (4)$$

The effective exposure time is preferably displayed visually, so that if necessary, the difference between the set nominal exposure time and the actual effective exposure time can be determined.

For the color deviation LEry,m,c, on the other hand, the following applies:

$$LEry = Ery - DEr \quad (5)$$
$$LErm = Erm - DEr$$
$$LErc = Erc - DEr$$

where one of the values Ery, Erm or Erc is equal to DEr and consequently, one of the values LEry, LErm or LErc is equal to zero.

In step S19, the values LEry,m,c are converted into step numbers MSy,m,c for the filter drives, and the stepper motors are activated in accordance with the number of steps in each instance (S20). In this connection, it should be stated that the filter corresponding to the color COLmin is excluded from this regulation. The two other filters, on the other hand, are adjusted until each of them has either carried out the prescribed number of adjustment steps MS, or has reached its end position outside the beam cross-section during the course of adjustment, which is signalized by the switching information O of the corresponding position switch SC.

The subsequent step S21 serves to find the color to be considered COLmin according to the resulting filter setting during the next regulation cycle. For this purpose, the switching status of the position switches SW1 and SW2 of those two filters, the color of which is not COLmin during the present regulation cycle, is determined. If none of these filters is located in the end position outside the beam path, the current color COLmin is maintained as such. If, on the other hand, both filters are in the end position, the step counters of the filter drives belonging to the filters are read off, and the color of that filter whose counter has the higher counter value is defined as COLmin. Finally, if only one of the two color filters in question is in the end position, the color of this filter becomes the color COLmin during the next regulation cycle.

The regulation cycle described is repeated constantly, and the balance is reached by successive approximation after a number of cycles which depends on the value of the original deviation. For this reason, a check takes place at a preset time interval after triggering of the first regulation cycle, to determine whether the existing filter deviation LEry,m,c is below a set threshold. If yes, exposure is released, if not, an error message is given.

As long as the exposure time has not been triggered yet, the value of Ko from (3) is updated at every regulation cycle, on the basis of the new value or DEr. If, on the other hand, exposure is in process, which is queried in step S17 of FIG. 3, the exposure time is updated for the duration of exposure, as determined by the mean value Kn of the correction factors K1, K2 ... Kn of consecutive measurement cycles, according to the equation (S18):

$$ETdrift = \frac{ETnom}{H} Kn \quad (6)$$

with $$Kn = \frac{K1 + K2 + \ldots Kn}{n} \quad (7)$$

The sliding residual exposure time is obtained from the difference between ETdrift and the time t which has elapsed since the beginning of the exposure $$ETrest = ETdrif - t \quad (8)$$

If ETrest becomes equal to zero (or negative), the exposure is discontinued by closing the shutter 11.

In order to facilitate calculation of the mean value Kn according to (6) after inclusion of another regulation cycle, the sum Sn=K1+K2+... Kn from (6) is placed in temporary memory for each cycle, and a system-internal counter is incremented by one unit at each new cycle.

We claim:

1. Method for regulation of an amount of printing light in a closed loop of an enlarging device equipped with a color filter device containing color filters, where the printing light influenced by the color filters is selectively measured in the primary colors red, green and blue, wherein a deviation (Ery,m,c) resulting from comparison of measured actual values with preset reference values is divided into color deviation (LEry,m,c) and brightness deviation (DEr), the color deviation (LEry,m,c) is balanced out by regulation of the color filters, said method including the step of establishing a nominal exposure time (ETnom), establishing a reference value of light intensity $(Iy,m,c)_{reference}$ and measuring an actual value of $(Iy,m,c)_{actual}$, and the brightness deviation (DEr) is converted into a correction factor (K) for adjusting the nominal exposure time (ETnom) to an effective exposure time ETeff, in such a manner that for each primary color, the product of the actual value of the light intensity $(Iy,m,c)_{actual}$ and the effective exposure time (ETeff) is constant and equal to the product of the reference value of the light intensity $(Iy,m,c)_{reference}$ and the nominal exposure time (ETnom).

2. Method according to claim 1 wherein the regulation of the amount of printing light takes place in individual, constantly repeating consecutive regulation cycles.

3. Method according to claim 2, wherein the effective exposure time (ETeff) is continuously updated during the exposure, as determined by the mean value (Kn) of the correction value (K1, K2 ... Kn) of the consecutive regulation cycles.

4. Method according to claim 3, wherein in view of the expansion of the mean value formation to a number of regulation cycles which is not determined in advance, the sum value (Sn) of the elements included in the mean value formation (K1, K2 ... Kn) is stored in memory for each individual cycle.

5. Apparatus for regulation of the amount of printing light in a closed loop of a photographic enlarger device, which is equipped with a color filter device and with color-selective light measurement means for the printing light influenced by the color filters, the apparatus comprising a microprocessor system, which is designed for the purposes calculating separate deviations for color (LEry,m,c) and brightness (DEr) from a deviation (Ery,m,c) between measured actual values and set reference values, in order to determine setting values for the filters as a function of the color deviation (ELry,m,c) and a correction value (K) for a preset nominal exposure time as a function of the brightness deviation (DEr).

6. Regulation apparatus according to claim 5, wherein the individual filters (3, 4, 5) of the filter device are driven by stepper motors and controlled via the microprocessor system (15), in such a way that the deviation with regard to one color (LEry,m,c) is converted into a corresponding number of motor steps of the filter in question.

7. Apparatus according to claim 5, wherein the microprocessor system (15) is designed to form the mean value (Kn) from correction factors determined in consecutive regulation cycles (K1, K2 ... Kn) and to correct the nominal exposure time for each cycle as determined by the updated mean value (Kn).

8. Apparatus according to claim 7, wherein the microprocessor system (15) places the sum value (Sn) of the elements included in the mean value formation (K1, K2 ... Kn) of the current and the preceding cycles into temporary memory, until the next subsequent cycle.

9. A method for regulating an amount of printing light in a closed loop of an enlarging device equipped with a color filter device including color filters having variable positions for influencing the printing light, the printing light being illuminated for an exposure time, said printing device also permitting the exposure time of the printing light to be varied, said method comprising the steps of:

a) establishing preset reference intensity values for the printing light for each of the primary colors red, green and blue;

b) establishing a nominal exposure time for the printing light;

c) measuring the intensity of the printing light in each of the primary colors red, green and blue;

d) comparing the actual measured intensity values for each of the three primary colors to the preset reference intensity values, and generating color deviation values and a brightness deviation value based upon such comparisons, the brightness deviation value being representative of a neutral density brightness of the printing light;

e) generating an exposure time correction factor K in accordance with the brightness deviation value;

f) adjusting the nominal exposure time in accordance with the exposure time correction factor to generate an effective exposure time; and g) adjusting the positions of the color filters within the color filter device in accordance with the color deviation values generated in step d) wherein, for each primary color; the actual measured intensity for each such primary color multiplied by the effective exposure time is equal to the preset reference intensity value for such primary color multiplied by the nominal exposure time.

10. The method recited by claim 9 wherein steps c) through g) are repeated during successive regulation cycles.

11. The method recited by claim 10 wherein, during an actual exposure cycle of the enlarging device, the effective exposure time is determined by the mean value (Kn) of the correction factors (K1, K2 ... Kn) generated during the successive regulation cycles.

12. The method recited by claim 11 wherein a new sum value (Sn) of the successive correction factors (K1, K2 ... Kn) is stored in memory after each successive regulation cycle for allowing a new mean value (Kn) to be computed for each regulation cycle.

13. An apparatus for regulating an amount of printing light in a closed loop of a photographic enlarger device, the photographic enlarger device including a color filter device including color filters having variable positions for influencing the printing light, and a color-selective light measurement means for measuring color intensity of the printing light emitted by the color filter device in each of the primary colors red, green and blue, said apparatus comprising in combination:

a) means for selecting preset reference intensity values for the printing light for each of the primary colors red, green and blue;

b) means for establishing a nominal exposure time for the printing light;

c) microprocessor means for comparing the actual measured intensity values for each of the three primary colors to the preset reference intensity values, and generating color deviation values based upon such comparisons;

d) means for generating a brightness deviation value representative of a neutral density brightness of the printing light, and generating an exposure time correction factor K in accordance with the brightness deviation value;

e) means for generating an effective exposure time by adjusting the nominal exposure time in accordance with the exposure time correction factor; and f) means for adjusting the positions of the color filters within the color filter device in accordance with the color deviation values generated by said microprocessor wherein for each primary color, the actual measured intensity value for each such primary color multiplied by the effective exposure time is equal to the preset reference intensity value for such primary color multiplied by the nominal exposure time.

14. The apparatus recited by claim 13 wherein the individual color filters of the color filter device are driven by stepper motors and controlled via the microprocessor wherein the color deviation value for each primary color is converted into a corresponding number of motor steps for the corresponding color filter.

15. The apparatus recited by claim 13 wherein the microprocessor generates the mean value (Kn) from correction factors determined in consecutive regulation cycles (K1, K2 . . . Kn), and wherein the established nominal exposure time for each successive regulation cycle is determined by the updated mean value (Kn).

16. The apparatus recited by claim 15 wherein the microprocessor saves the sum value (Sn) of the elements included in the mean value formation (K1, K2 . . . Kn) of the current and preceding regulation cycles into a temporary memory for use during the next consecutive regulation cycle.

* * * * *